United States Patent
Smith et al.

(10) Patent No.: US 10,937,199 B2
(45) Date of Patent: Mar. 2, 2021

(54) HANDLING COLOR VISION DEFICIENCIES IN VIRTUAL, AUGMENTED, AND MIXED REALITY (XR) APPLICATIONS

(71) Applicant: Dell Products, L.P., Round Rock, TX (US)

(72) Inventors: Hana Schuster Smith, Boulder, CO (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/033,351

(22) Filed: Jul. 12, 2018

(65) Prior Publication Data

US 2020/0020138 A1    Jan. 16, 2020

(51) Int. Cl.
| | |
|---|---|
| *G06T 11/00* | (2006.01) |
| *G06T 7/90* | (2017.01) |
| *G06K 9/32* | (2006.01) |
| *G06F 3/01* | (2006.01) |
| *G06K 9/00* | (2006.01) |
| *G06F 3/16* | (2006.01) |

(52) U.S. Cl.
CPC ............ *G06T 11/001* (2013.01); *G06F 3/013* (2013.01); *G06F 3/16* (2013.01); *G06K 9/00671* (2013.01); *G06K 9/3233* (2013.01); *G06T 7/90* (2017.01)

(58) Field of Classification Search
CPC ......... G06T 11/001; G06T 7/90; G06F 3/013; G06F 3/16
USPC ....................................................... 345/633
See application file for complete search history.

(56) References Cited

U.S. PATENT DOCUMENTS

| | | | |
|---|---|---|---|
| 9,727,737 B1* | 8/2017 | Hitchcock ............. | G06F 21/577 |
| 2011/0043644 A1* | 2/2011 | Munger ................ | G02B 27/017 |
| | | | 348/207.1 |
| 2014/0098137 A1* | 4/2014 | Fein ........................ | G06T 11/00 |
| | | | 345/633 |
| 2014/0267419 A1* | 9/2014 | Ballard .................... | G06T 11/00 |
| | | | 345/633 |
| 2016/0133221 A1* | 5/2016 | Peana ...................... | G09G 5/10 |
| | | | 345/156 |

(Continued)

OTHER PUBLICATIONS

"Spectral Edge launches Ultra HD solution for color-blind viewers at M-Enabling Summit," © Jun. 2017, 3 pages, Copyright 2018 Spectral Edge, available at https://www.spectraledge.co.uk/spectral-edge-launches-ultra-hd-solution-for-color-blind-viewers-at-m-enabling-summitt/.

(Continued)

*Primary Examiner* — Hai Tao Sun
(74) *Attorney, Agent, or Firm* — Fogarty LLP (57) ABSTRACT

Systems and methods for handling color vision deficiencies in virtual, augmented, and mixed reality (xR) applications are described. In some embodiments, a hardware memory device may have program instructions stored thereon that, upon execution by a hardware processor of an Information Handling System (IHS), cause the IHS to: apply a first set of RGB adjustments to a foreground portion of an image to be displayed by Head-Mounted Device (HMD) worn by a user; apply a second set of RGB adjustments to a background portion of the image, where the first and second set of RGB adjustments produce a visual indication of the presence of a color, in the image, that the user is incapable of naturally identifying; and display the visual indication.

17 Claims, 7 Drawing Sheets

(56) References Cited

U.S. PATENT DOCUMENTS

2017/0287446 A1* 10/2017 Young .................... G09G 5/391
2018/0278903 A1*  9/2018 Iwadate ............... H04N 9/3194
2018/0342103 A1* 11/2018 Schwarz ............... G06T 19/006

OTHER PUBLICATIONS

"TV image adapted to give colorblind people a better view," Sep. 9, 2015, 3 pages, Copyright © 2018 SPIE Europe, available at http://optics.org/news/6/9/16.
Yu-Chieh Chen, et al., "Hardware Digital Color Enhancement for Color Vision Deficiencies," ETRI Journal, Feb. 2011, 7 pages, vol. 33, No. 1, © 2011 ETRI.

* cited by examiner

HANDLING COLOR VISION DEFICIENCIES IN VIRTUAL, AUGMENTED, AND MIXED REALITY (XR) APPLICATIONS

FIELD

The present disclosure generally relates to Information Handling Systems (IHSs), and, more particularly, to systems and methods for handling color vision deficiencies in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In modern applications, IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible.

In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In modern implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for handling color vision deficiencies in virtual, augmented, and mixed reality (xR) applications are described. In an illustrative, non-limiting embodiment, a hardware memory device may have program instructions stored thereon that, upon execution by a hardware processor of an Information Handling System (IHS), cause the IHS to: apply a first set of RGB adjustments to a foreground portion of an image to be displayed by Head-Mounted Device (HMD) worn by a user; apply a second set of RGB adjustments to a background portion of the image, where the first and second set of RGB adjustments produce a visual indication of the presence of a color, in the image, that the user is incapable of naturally identifying; and display the visual indication.

In some cases, the visual indication may have a geometric shape selected to match a shape of an underlying real-world object. The program instructions may further cause the IHS to maintain the visual indication positioned over the real-world object as the user moves around a physical environment. Additionally, or alternatively, the program instructions may cause the IHS to apply the first and second sets of RGB adjustments to a selected portion of the image to the exclusion of another portion of the image in response to a determination that the user's gaze is directed at the selected portion.

In another illustrative, non-limiting embodiment, an IHS may include a host processor and a memory coupled to the host processor, the memory having program instructions stored thereon that, upon execution, cause the IHS to: receive an image of a real-world environment from a camera coupled to an HMD worn by a user in an xR application; identify, in the image, a real-world object having a color corresponding to a color vision deficiency of the user; and produce a digital image, for display by the HMD, that overlays a selected color upon the real-world object via the HMD.

The color vision deficiency may reduce the user's ability to naturally distinguish between a plurality of colors. The selected color may exclude the plurality of colors. Additionally, or alternatively, the selected color may identify the presence of the color.

Producing the digital image may include applying a first set of RGB adjustments to a foreground portion of the image and applying a second set of RGB adjustments to a background portion of the image. And the program instructions may cause the IHS to produce the digital image with a dynamic visual effect selected from the group consisting of: blinking, flashing, and glowing.

The digital image may have a geometric shape selected to match a shape of the real-world object. To produce the digital image, the program instructions may cause the IHS to maintain a position of the digital image on a display frame relative to the real-world object as the user moves in the real-world environment. Additionally, or alternatively, to produce the digital image, the program instructions may cause the IHS to maintain a position of the digital image on a display frame relative to the real-world object as the real-world object moves in the real-world environment.

The program instructions, upon execution may cause the IHS to provide an audio cue associated with the selected color for reproduction by the HMD in response to a distance between the user's hand and the real-world object meeting a threshold value. To identify the real-world object, the program instructions, may cause the IHS to analyze a selected portion of the image to the exclusion of another portion of the image in response to a determination that a user's gaze is directed at the selected portion.

In yet another illustrative, non-limiting embodiment, a method may include receiving an image from an HMD worn by a user; identifying, in the image, a first real-world object having a first color and a second real-world object having a second color; determining, based upon a calibration process, that the user does not naturally distinguish between the first and second colors; and in response to the determination, producing a digital image, for display by the HMD, that overlays a selected color upon either: (i) the first real-world object, or (ii) the second real-world object, as visible through the HMD.

The selected color may exclude the first and second colors and may identify the presence of the first color. The digital may have has a geometric shape selected to match a shape of the first or second real-world object, and the method may include causing the digital image to blink, flash, or glow.

Producing the digital image further may include applying a first set of RGB adjustments to a foreground portion of the image and applying a second set of RGB adjustments to a background portion of the image. And the method may also include analyzing a selected portion of the image to the exclusion of another portion of the image in response to a determination that a user's gaze is directed at the selected portion.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein relate to systems and methods for handling color vision deficiencies in virtual, augmented, and mixed reality (xR) applications. These techniques are particularly useful in xR applications that employ Head-Mounted Devices (HMDs), Heads-Up Displays (HUDs), and eyeglasses—collectively referred to as "HMDs." As the inventors hereof have determined, HMDs are starting to become pervasive in many xR applications, including, but not limited to: factory, industrial, and first responders.

The inventors hereof have also recognized, however, that approximately 1 in 12 people have some form of color blindness or Color Vision Deficiency (CVD). The condition ranges from a variety of classes, with red-green "color blindness" being the most common. For these persons, red and green photo-pigments have more overlap than normal, making them unable to see certain colors (e.g., difficult time distinguishing between red and green).

Different classes of CVD include protanomaly (i.e., anomalous red cone-shaped cells in the retina), deuteranomaly (i.e., anomalous green cells), and tritanomaly (i.e., anomalous blue cells). In order to distinguish the color red from the color green, a protanomalous user generally needs stronger red light intensity than a normal user, and a deuteranomalous user needs stronger green light intensity than the normal user.

As an illustrative use-case, consider an xR HMD employed to provide step-by-step directions (e.g., written or video) to a worker in a manufacturing or factory environment, as part of a day-to-day engineering or design job. If the worker is colorblind, green or red objects (e.g., a color-coded wire-harness) may be difficult for that user to naturally interpret or perceive—whether those objects are digitally displayed by the HMD, or visible through the HMD in the physical environment. However, in many of these environments, colors are routinely used to convey information (e.g., how to assemble terminals by matching like-colors, etc.), to identify that something is safe (e.g., a green sign may indicate that water is potable, etc.), or to identify danger (e.g., a red wire may indicate a high-voltage, etc.). As such, the consequences of color blindness can range from mere inconvenience to serious health and safety issues.

Figure 6A:
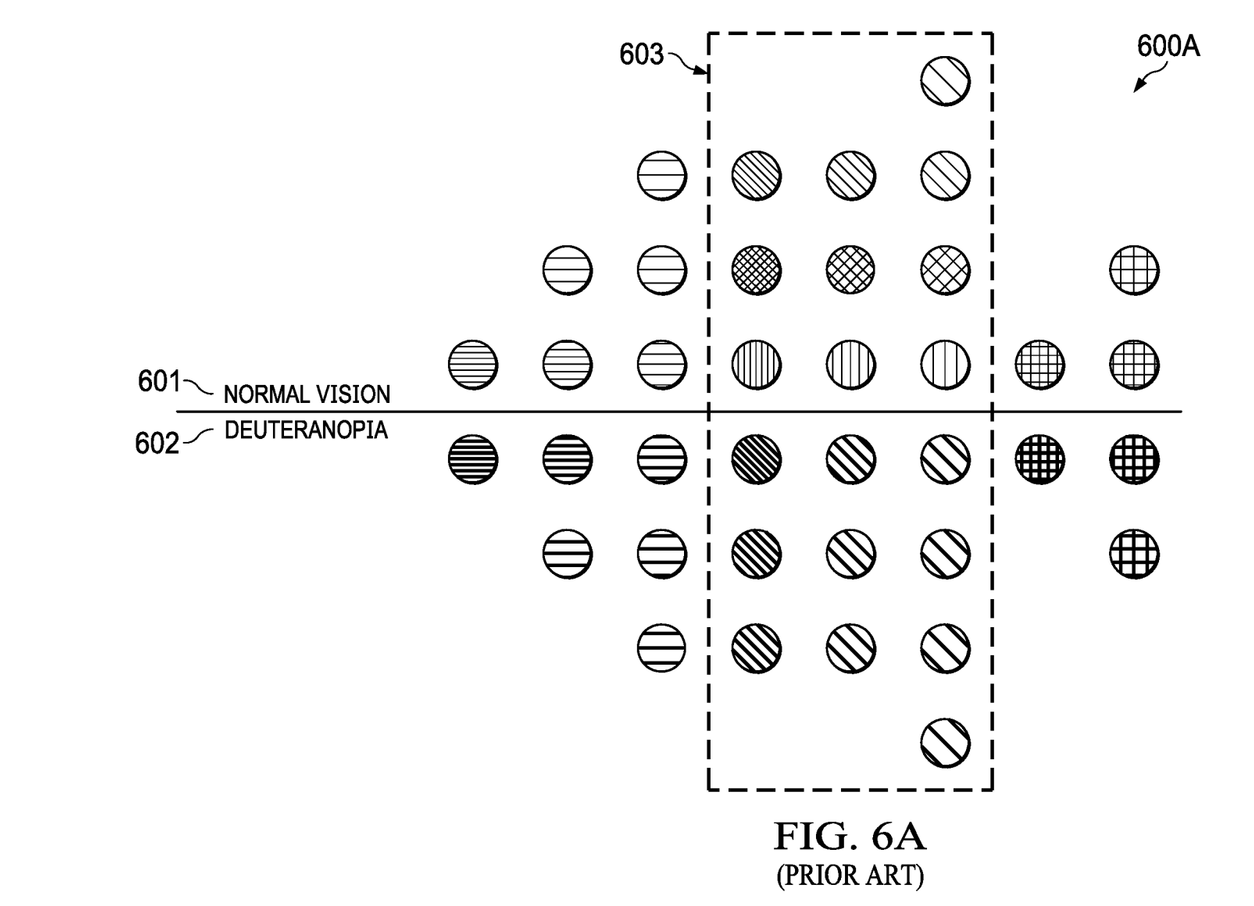
FIGS. 6A-C illustrate comparisons between the visual perception of a normal person and the visual perception of a deuteranope person, in a conventional setting.
Figure 6B:
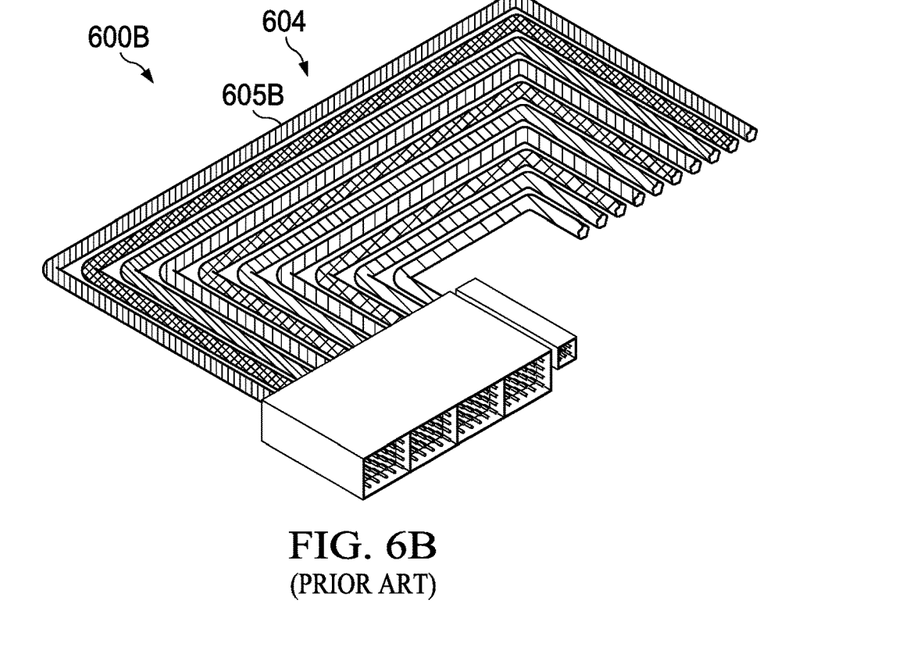
Figure 6C:
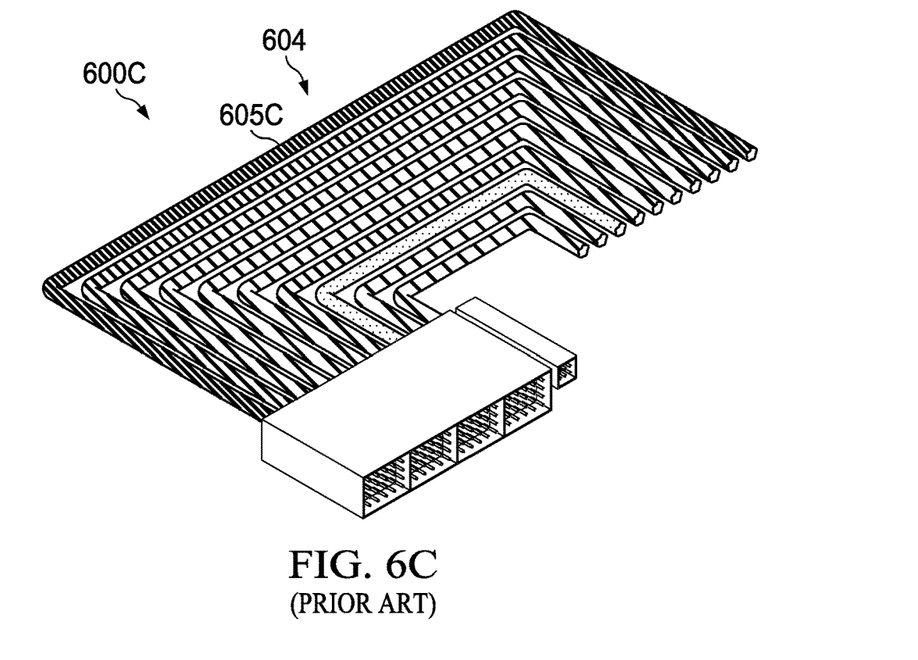

FIGS. 6A-C shows comparisons between the visual perception of a normal person and the visual perception of a deuteranope person, in a conventional setting, for sake of explanation. Particularly, FIG. 6A shows a comparative histogram 600A with different colors, as perceived by a normal person 601 and by a deuteranope 602. Each color is perceived a differently by the two users, as illustrated by symmetric colors in graph 600A having similar, but different shading or patterns. In area 603, however, the distinction between what normal person 601 sees and deuteranope 602 sees is more dramatic: when normal person 601 sees "red," deuteranope 602 sees "green"; and when normal person 601 sees "green," deuteranope 602 still sees a similar "green."

As a result, even though normal person 601 can easily tell colors 603 apart, deuteranope 602 cannot. To illustrate, FIG. 6B shows a normal person's perception 600B of cable 604, where red wire 605B is properly perceived as "red." Meanwhile, FIG. 6C shows a deuteranope's perception 600C of the same cable 604, such that red wire 605C is perceived as "green." Generally, it is more difficult for deuteranope user 602 to distinguish between the various colors (e.g., here patterns or shadings) of different wires using deuteranope's perception 600C, than it is for normal user 601 using normal perception 600B.

To address these and other concerns, in various embodiments, systems and methods described herein may provide interactive applications that can enhance an HMD's display to mitigate for color blindness and other visual deficiencies. These systems and methods may be configured to digitally enhance HMD display background and virtual overlays in steady state to compensate and/or enhance for specific color blindness attribute(s) of the wearer, which may be determined in a calibration process. In some cases, eye gaze tracking may be employed to optimize a region-of-gaze-interest (ROGI) enhancement of color only (versus an entire display video frames).

Across various implementations, there may be situations where the same HMDs have to be shared between different users, such as in a factory floor, and therefore it may not be practical to employ a unique glass for each user-specific type of color blindness. Instead, a user-specific calibration process may be used to individually calibrate the type/degree of color blindness for each user, and to enhance the color palette of the HMD display sufficiently to provide a significant visual distinction to help the colorblind user.

Generally, an xR image may include a real-world field-of-view (FOV) portion, directly visible through the HMD display, which may be enhanced by adding a bias to the background. Additionally, or alternatively, virtual or digital objects may be produced and rendered, as a digital portion of the xR image, that identify the presence of a color in an image, to the user, that the user may not be capable of directly perceiving.

In some embodiments, a service implemented via a host Information Handling System (IHS), tethered or coupled to an HMD, may include a calibration operation that takes the user through a preset sequence for ascertaining the user's color blindness, for instance, by presenting standard color patterns and receiving the user's identification or perception. The service may also comprise one or more preset lookup tables (LUTs) mapping each of a plurality of different color blindness modes to a corresponding set of coefficients Alpha, Beta and Gamma for pixel enhancement for R, G and B color planes, referred to as "Alpha_R," "Beta_R," "Gamma_R," "Alpha_G," "Beta_G," "Gamma_G," "Alpha_B," "Beta_B," "Gamma_B," respectively.

As used herein, the term "look-up table" or "LUT" refers to an array or matrix of data that contains items that are searched. In many cases, LUTs may be arranged as key-value pairs, where the keys are the data items being searched (looked up) and the values are either the actual data or pointers to where the data are located.

A first LUT may comprise values to be applied to the FOV portion of an image (e.g., a background or real-world layer), whereas a second LUT may comprise values to be applied to digital content (e.g., overlaid upon, or replacing a portion of, the background). These preset LUTs are user independent and are calibrated for an HMD display at factory or during manufacturing based upon the HMD display's properties, etc. Post-calibration, a tutorial may also be provided to train the user on the color mapping with audio and other cues.

In other embodiments, a service implemented via a host IHS may perform steady-state analysis on the rendered content, before the content is displayed, using calibrated coefficients. In some embodiments, this service may be directly supported by a display driver to be part of display processing, and thereby it need not take up host CPU or GPU resources.

In yet other embodiments, systems and methods described herein may provide adaptive enhancement of either entire frame, or region of gaze interest (ROGI), or completely turn off enhancement to reduce host CPU/GPU resource loading, and/or in response to prioritization against other host IHS processes. In some cases, these systems and methods may process the output of a rendering engine before it reaches the display driver, or it may be implemented as an Application Programming Interface (API) to a display driver that supports configurable enhancement from host, without extra hardware.

Figure 1:
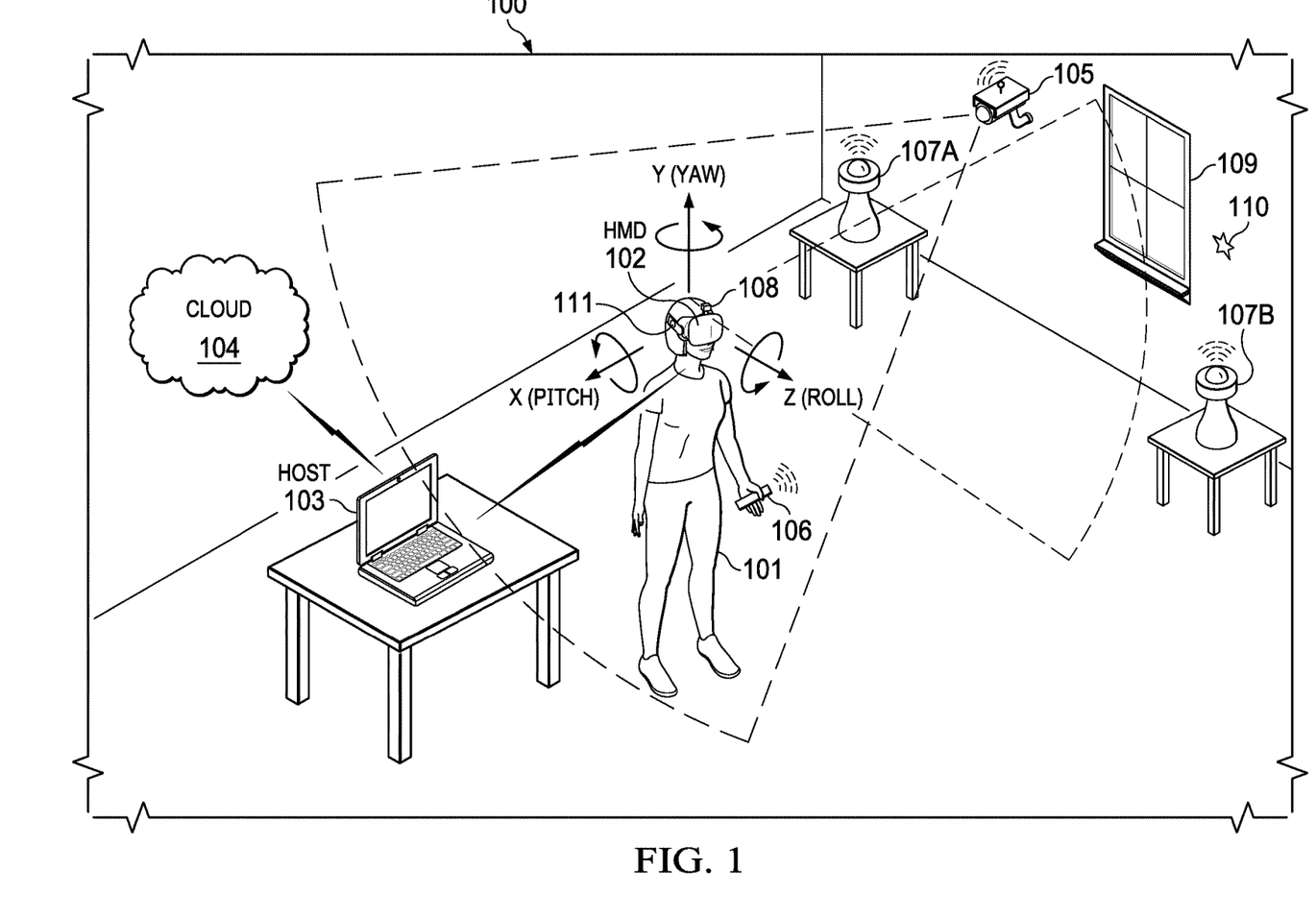
FIG. 1 is a perspective view of an example of a physical environment where a virtual, augmented, and mixed reality (xR) application is executed, according to some embodiments.

FIG. 1 is a perspective view of an example of physical environment 100 where an xR application is executed. In various embodiments, user 101 may wear HMD 102 around their heads and over their eyes, during execution of an xR application. An xR application may include a subset of components or objects executed by HMD 102 and another subset of components or objects executed by host IHS 103.

HMD 102 may be tethered to host IHS 103 via a wired or wireless connection. Particularly, host IHS 103 may be used to generate digital images to be displayed by HMD 102. HMD 102 transmits information to host IHS 103 regarding the state of user 101 (e.g., physical position, head orientation, gaze focus, etc.), which in turn enables host IHS 103 to determine which image or frame to show to the user next, and from which perspective.

For instance, as user 101 moves about environment 100, any change in: (i) physical location (e.g., x, y, and z) or translation; or (ii) orientation (e.g., pitch, yaw, and roll) or rotation, may cause host IHS 103 to effect a corresponding change in the picture or symbols displayed to user 101 via HMD 102. These changes may be detected by HMD 102 and processed by host IHS 103, for example, to maintain congruence with the outside world and/or to allow user 101 to look around a consistent virtual reality environment.

In some implementations, host IHS 103 may execute a runtime or rendering engine, such as UNITY, UNREAL, AUTODESK, etc., which produces a visual xR model displayed by HMD 102 from a unique point-of-view, based upon the location, pose, and/or gaze of user 101—which may be determined, at least in part, using Simultaneous Location and Mapping (SLAM).

As used herein, the term SLAM refers systems and methods that use positional tracking devices to construct a map of an unknown environment where an HMD is located, and that simultaneously identifies where the HMD is located, its orientation, and/or pose.

Generally, SLAM methods implemented in connection with xR applications may include a propagation component, a feature extraction component, a mapping component, and an update component. The propagation component may receive angular velocity and accelerometer data from an Inertial Measurement Unit (IMU) built into the HMD, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as the HMD moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100 and/or one or more tokens 106 or tags 110 that are tracked; such that HMD 102 triangulates its position and/or state using those elements.

Inertial tracking may use data from accelerometers and gyroscopes within HMD 102 to find a velocity and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera (IR covers a portion of the electromagnetic spectrum from approximately 0.9 μm to 14

µm). With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100.

In various embodiments, data obtained from a positional tracking system and technique employed by HMD 102 may be received by host IHS 103, which in turn executes the SLAM method of an xR application. In the case of an inside-out SLAM method, for example, an xR application receives the position and orientation information from HMD 102, determines the position of features extracted from the images captured by camera 108, and corrects the localization of landmarks in space using comparisons and predictions.

An estimator, such as an Extended Kalman filter (EKF) or the like, may be used for handling the propagation component of an inside-out SLAM method. In some cases, a map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100 may be obtained, at least in part, from cloud 104.

In some cases, an IR or NIR SLAM camera may be further configured to capture thermographic images of target objects, and to provide accurate non-contact temperature measurements of those objects.

Figure 2:
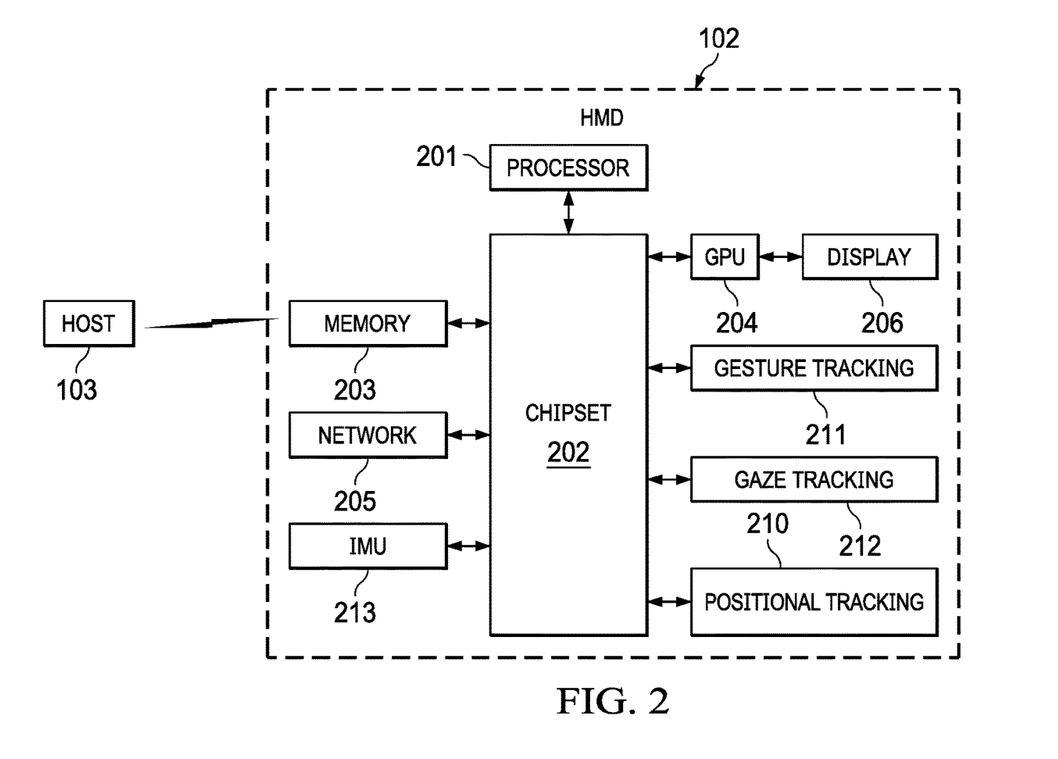
FIG. 2 is a block diagram of an example of a Head-Mounted Display (HMD) and a host Information Handling System (IHS), according to some embodiments.

FIG. 2 is a block diagram of an example HMD 102 and host IHS 103, according to some embodiments. As depicted, HMD 102 includes components configured to display an all-immersive virtual environment and/or to overlay digitally-created content or images on a display, panel, or surface (e.g., an LCD panel, an OLED film, a projection surface, etc.), in place of and/or in addition to the user's natural visual perception of the real-world.

As shown, HMD 102 includes processor 201. In various embodiments, HMD 102 may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

HMD 102 includes chipset 202 coupled to processor 201. In certain embodiments, chipset 202 may utilize a QuickPath Interconnect (QPI) bus to communicate with processor 201. In various embodiments, chipset 202 provides processor 201 with access to a number of resources. For example, chipset 202 may be coupled to network interface 205 to enable communications via various wired and/or wireless networks.

Chipset 202 may also be coupled to display controller or graphics processor (GPU) 204 via a graphics bus, such as an Accelerated Graphics Port (AGP) or Peripheral Component Interconnect Express (PCIe) bus. As shown, graphics processor 204 provides video or display signals to display 206.

Chipset 202 further provides processor 201 and/or GPU 204 with access to memory 203. In various embodiments, memory 203 may be implemented using any suitable memory technology, such as static RAM (SRAM), dynamic RAM (DRAM) or magnetic disks, or any nonvolatile/Flash-type memory, such as a solid-state drive (SSD) or the like. Memory 203 may store program instructions that, upon execution by processor 201 and/or GPU 204, present an xR application to user 101 wearing HMD 102.

Other resources coupled to processor 201 through chipset 202 may include, but are not limited to: positional tracking system 210, gesture tracking system 211, gaze tracking system 212, and inertial measurement unit (IMU) system 213.

Positional tracking system 210 may include one or more optical sensors (e.g., a camera 108) configured to determine how HMD 102 moves in relation to environment 100. For example, an inside-out tracking system 210 may be configured to implement tracking techniques that use distinctive visual characteristics of the physical environment to identify specific images or shapes which are then usable to calculate HMD 102's position and orientation.

Gesture tracking system 211 may include one or more cameras or optical sensors that enable user 101 to use their actual hands for interaction with objects rendered by HMD 102. For example, gesture tracking system 211 may be configured to implement hand tracking and gesture recognition in a 3D-space via a user-facing 2D camera. In some cases, gesture tracking system 211 may track a selectable number of degrees-of-freedom (DOF) of motion, with depth information, to recognize dynamic hand gestures (e.g., swipes, clicking, tapping, grab and release, etc.) usable to control or otherwise interact with xR applications executed by HMD 102.

Gaze tracking system 212 may include an inward-facing projector configured to create a pattern of infrared or (near-infrared) light on the user's eyes, and an inward-facing camera configured to take high-frame-rate images of the eyes and their reflection patterns; which are then used to calculate the user's eye's position and gaze point. In some cases, gaze detection or tracking system 212 may be configured to identify a direction, extent, and/or speed of movement of the user's eyes in real-time, during execution of an xR application (e.g., a gaze vector). In addition, gaze detection or tracking system 212 may be configured to calculate a ROGI, of configurable size or shape (e.g., rectangular), based in part upon a gaze vector obtained using eye/gaze tracking (EGT) processing.

IMU system 213 may include one or more accelerometers and gyroscopes configured to measure and report a specific force and/or angular rate of the user's head. In some cases, IMU system 212 may be configured to a detect a direction, extent, and/or speed of rotation (e.g., an angular speed) of the user's head in real-time, during execution of an xR application.

In some implementations, HMD 102 may communicate with host IHS 103 via wired or wireless connections (e.g., WiGig, WiFi, etc.). For example, if host IHS 103 has more processing power and/or better battery life than HMD 102, host IHS 103 may be used to offload some of the processing involved in the creation of the xR experience. In some cases, host IHS 103 may be built into (or otherwise coupled to) a backpack or vest, wearable by user 101.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

In various embodiments, HMD 102 and/or host IHS 103 may not include each of the components shown in FIG. 2. Additionally, or alternatively, HMD 102 and/or host IHS 103 may include components in addition to those shown in FIG. 2. Furthermore, components represented as discrete entities in FIG. 2 may, in some embodiments, be integrated with other components. In various implementations, all or a portion of the functionality provided by the illustrated components may be provided by components integrated as a System-On-Chip (SOC), or the like.

Figure 3:
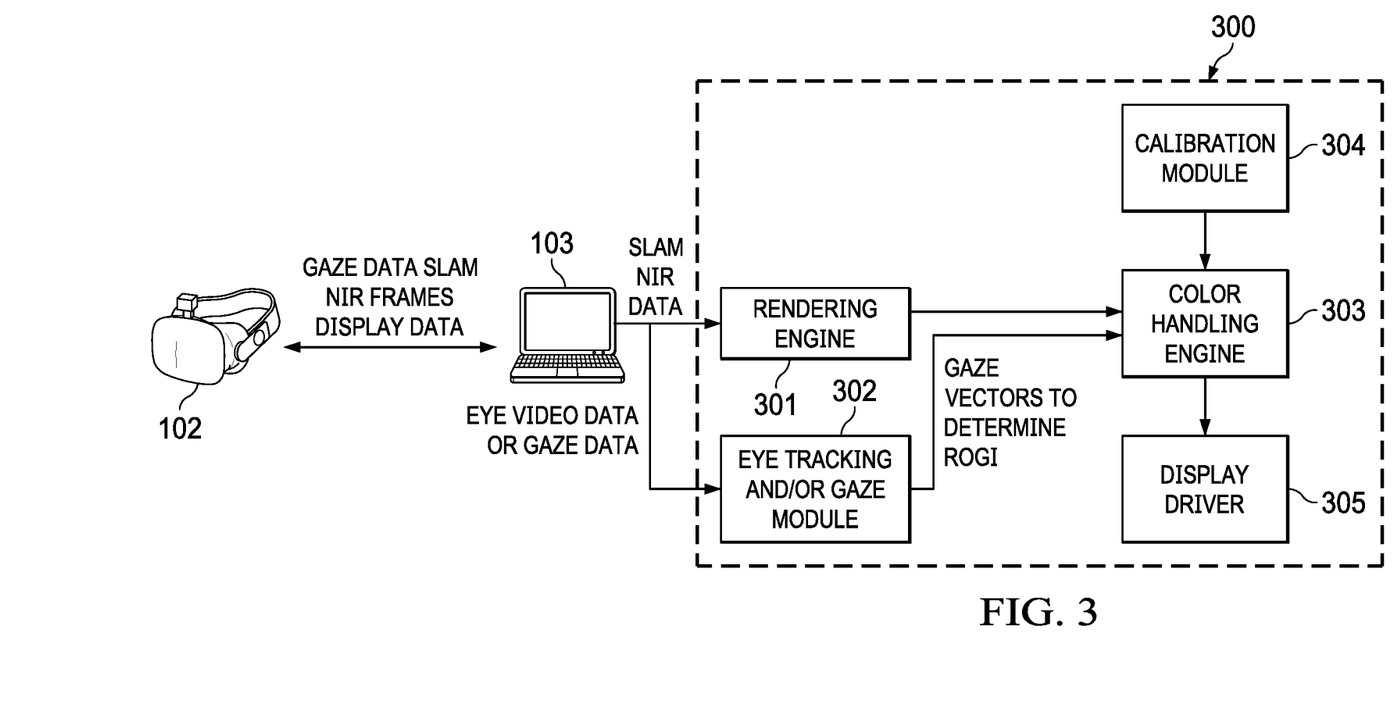
FIG. 3 is a block diagram of an example of a system for handling color vision deficiency in xR applications, according to some embodiments.

FIG. 3 is a block diagram of an example of system 300 for handling color vision deficiency in xR applications. In various embodiments, system 300 may include program instructions stored in a memory device (e.g., a system memory) that, upon execution, cause a host IHS to perform a number of operations, described in more detail below. As shown, system 300 may include rendering engine 301, eye tracking and/or gaze detection module 302, color handling engine 303, calibration module 304, and display driver 305.

In operation, HMD 102 detects eye or gaze tracking information (e.g., using component 212) and transmits that data to host IHS 103. In response to the processing of image or display data received by system 300, host IHS 103 provides HMD 102 with display frames that also include colorblindness enhancements, or the like.

Particularly, as part of the processing performed by system 300, rendering engine 301 receives NIR frames/data from a SLAM camera, such as may be disposed in a selected one of lighthouses 107. Then, rendering engine 301 generates digital images to be displayed by HMD 102, from a selected perspective based upon the user's current state, and provides those images to color handling engine 303. Meanwhile, eye tracking and/or gaze module 302 receives eye video data and/or gaze data detected via HMD 102.

Color handling engine 303 may apply a first set of RGB adjustments to a foreground portion of an image, and a second set of RGB adjustments to a background portion of the image. Additionally, or alternatively, color handling engine 303 may detect one or more colors and/or objects in an image, based upon the output of rendering engine 301 (and/or by performing feature extraction using camera frames/data), using information stored in calibration module 304. In various embodiments, calibration module 304 may include color codes, values, and/or offsets to be applied to different portions or layers of an image, or to a selected digital object within an image, by color handling engine 303.

These enhancements may be used to counter the user's color vision deficiency to a degree sufficient to allow the user to identify the presence of a color in the image, despite the user's inability to naturally perceive or identify that color. Additionally, or alternatively, these enhancements may be used to enable the user to distinguish between two different colors that are naturally perceived as one color by that user.

In some cases, calibration module 304 may also include one or more parameters or settings usable by color handling engine 303 to determine, for example, whether to analyze entire video frames or smaller ROGIs, based on the output of module 302. Additionally, or alternatively, calibration module 304 may include one or more parameters or settings usable by color handling engine 303 to determine whether to scale color handling processing up or down (e.g., to increase or decrease the size of a ROGI, or to process an entire frame), based on currently monitored system demands and loads (e.g., processor and memory usage).

Figure 4:
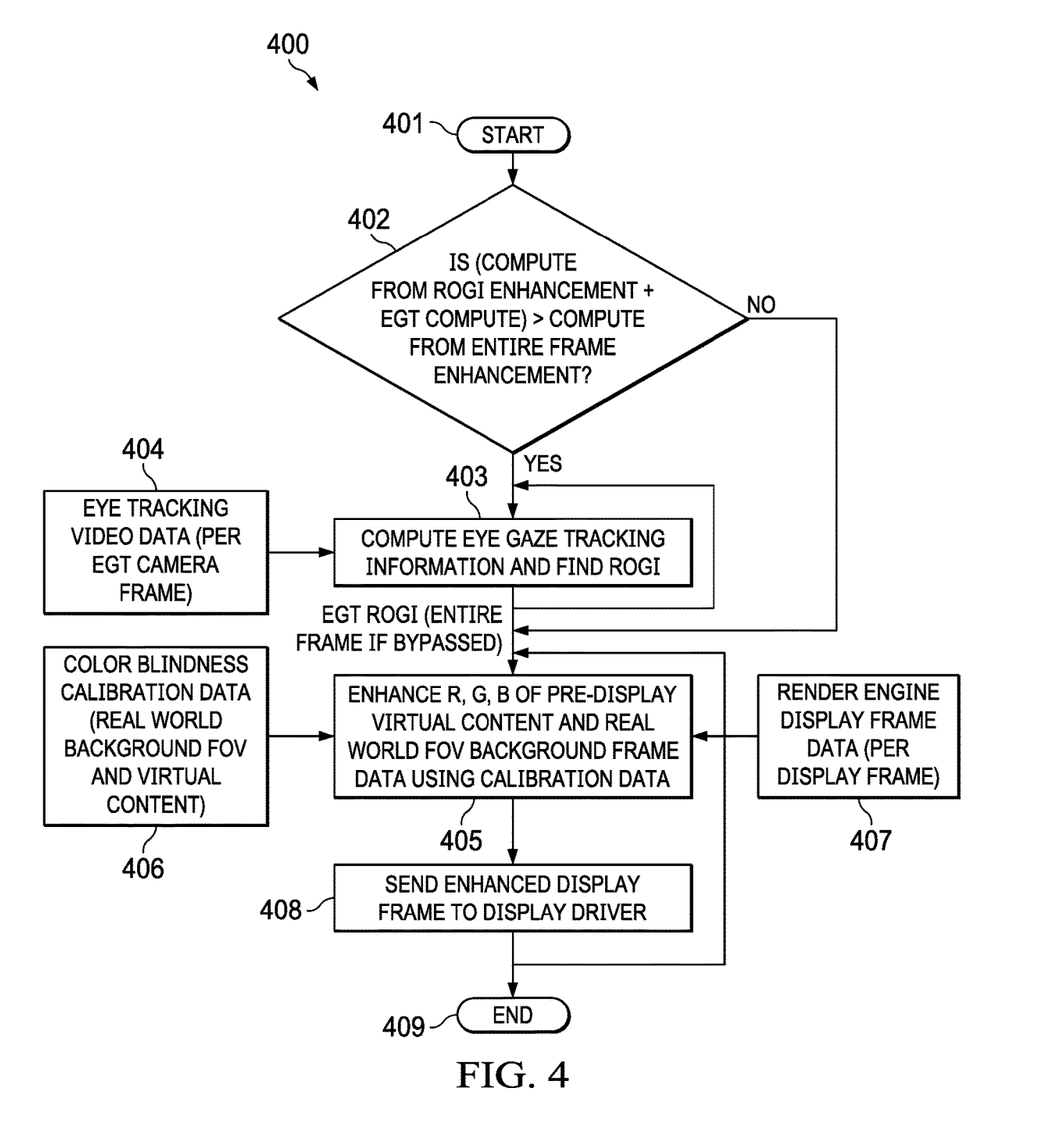
FIG. 4 is a flowchart of an example of a method for handling color vision deficiency in xR applications, according to some embodiments.

FIG. 4 is a flowchart of method 400 for handling color vision deficiency in xR applications. In some embodiments, method 400 may be performed, at least in part, through the execution of color handling engine 303 by host IHS 103. Method 400 begins at block 401.

At block 402, method 400 determines whether the compute load of a ROGI analysis, using EGT processing, would be greater than the compute load for an entire display frame. If so, block 403 receives eye tracking video data (e.g., a gaze vector) from block 404 and computes EGT to select the ROGI; otherwise, method 400 skips block 403.

In some cases, block 402 may also determine whether to scale color handling processing down based on current system demands, for example, enable or disable color correction in response to emergencies or high-priority situations, to the exclusion of other types of processing, in response to an increase in SLAM, gesture recognition, rendering, or other processing and memory usage on host IHS 103.

Method 400 receives colorblindness calibration data from block 406 and display frames from 407 at block 405. Block 405 enhances the R, G, and B values of each pixel in the display, either within the ROGI or in the entire frame, depending upon the outcome of block 402. In some cases, a first LUT of RGB values, offsets, or calculations may be applied to background layer of real-world object(s), and a second LUT of RGB values, offsets, or calculations may be applied to digital objects overlaid upon the real-world object(s).

For example, at block 405, RGB components of the pre-display virtual content pixels may each be handled or enhanced as follows, where "Nbits" is the number of bits of display components:

$$R\_new[i][j]=\min(\max(\text{Round}((R\_old[i][j]*\text{Alpha}\_R\_\text{virt}+\text{Beta}\_R\_\text{virt})^{\char`\^}\text{Gamma}\_R\_\text{virt}),2^{\char`\^}N\text{bits}-1),0); \qquad 1)$$

$$G\_new[i][j]=\min(\max(\text{Round}((G\_old[i][j]*\text{Alpha}\_G\_\text{virt}+\text{Beta}\_G\_\text{virt})^{\char`\^}\text{Gamma}\_G\_\text{virt}),2^{\char`\^}N\text{bits}-1),0); \text{ and} \qquad 2)$$

$$B\_new[i][j]=\min(\max(\text{Round}((B\_old[i][j]*\text{Alpha}\_B\_\text{virt}+\text{Beta}\_B\_\text{virt})^{\char`\^}\text{Gamma}\_B\_\text{virt}),2^{\char`\^}N\text{bits}-1),0). \qquad 3)$$

Still at block 405, RBG components of the pre-display real-world background (normally see-through in the user's FOV) may each be handled or enhanced as follows:

$$R\_new[i][j]=\min(\max(\text{Round}((R\_old[i][j]*\text{Alpha}\_R\_\text{bgnd}+\text{Beta}\_R\_\text{bgnd})^{\char`\^}\text{Gamma}\_R\_\text{bgnd}),2^{\char`\^}N\text{bits}-1),0); \qquad 1)$$

$$G\_new[i][j]=\min(\max(\text{Round}((G\_old[i][j]*\text{Alpha}\_G\_\text{bgnd}+\text{Beta}\_G\_\text{bgnd})^{\char`\^}\text{Gamma}\_G\_\text{bgnd}),2^{\char`\^}N\text{bits}-1),0); \text{ and} \qquad 2)$$

$$B\_new[i][j]=\min(\max(\text{Round}((B\_old[i][j]*\text{Al-} \\ \text{pha}\_B\_\text{bgnd}+\text{Beta}\_B\_\text{bgnd})^\wedge\text{Gamma}\_B\_\text{bgnd}), \\ 2^\wedge N\text{bits}-1),0). \qquad 3)$$

At block 408, method 400 sends a new display frame to HMD 102 with the updated RGB values calculated at block 405, for each pixel of the ROGI and/or the entire display frame. Method 400 ends at block 409.

In various embodiments, the adjustment of RGB components for a background portion of a frame and for a foreground portion of the frame, independently or separately performed, as described above, may enable colorblind viewers to better differentiate color combinations they would ordinarily struggle to see, such as red-green or pink-grey, for example. Particularly in xR applications, where the background layer comprises real-world objects and the foreground is made of digital image overlays, or the like, color handling engine 303 may provide colorblind users with more reliable color distinctions.

It should be noted that, although the handling of color vision deficiencies in method 400 is being performed in the RGB color space, other color spaces may be used. Color space systems in-use today include, but are not limited to: RGB (red, green, blue), CMYK (cyan, magenta, yellow, black), and HSI (hue, saturation, intensity). In various embodiments, method 400 may be performed in any suitable color space.

Figure 5A:
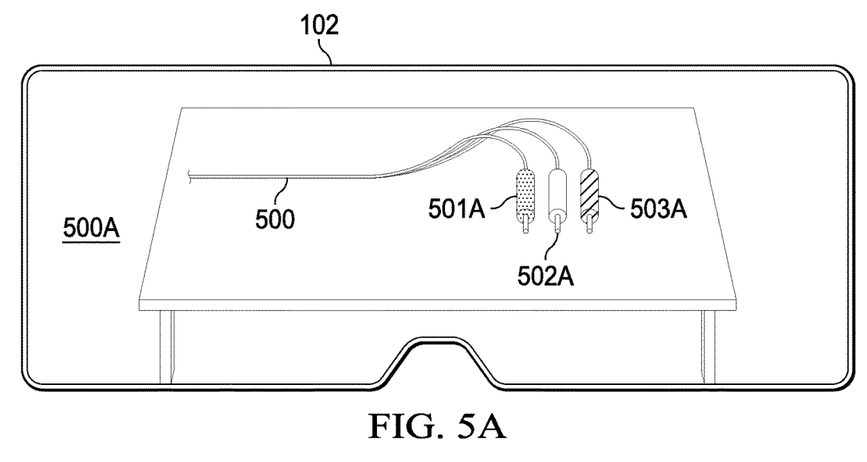
FIGS. 5A-C are screenshots of HMD displays showing various example use-cases, according to some embodiments.
Figure 5B:
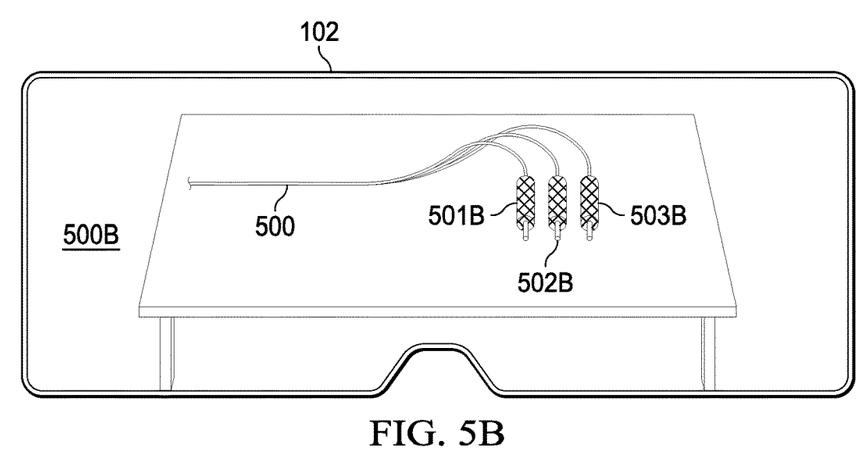
Figure 5C:
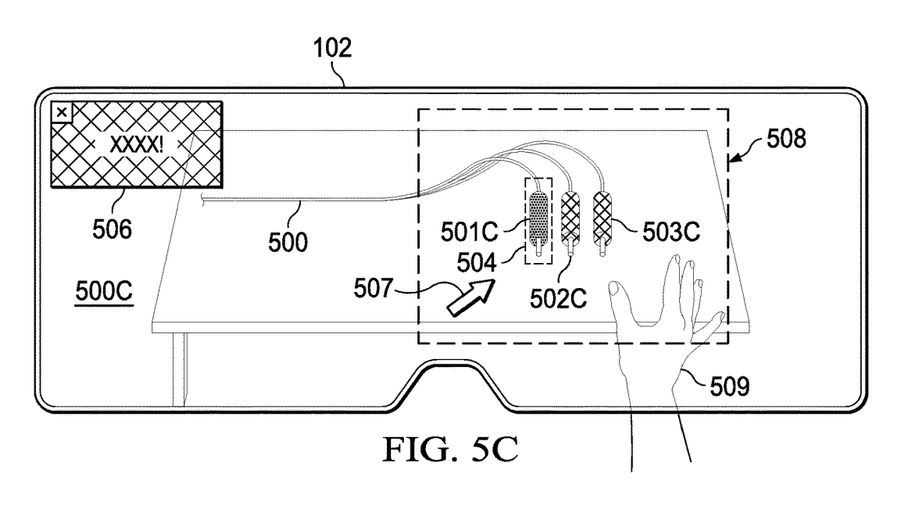

FIGS. 5A-C show screenshots 500A-C of an xR display within HMD 102. In each case, real-world object 500 (e.g., an electronic cable assembly) is directly visible through the HMD's display or glass, sitting on a work surface. In the real world, 500 has a plurality of terminals or connectors, and each connector has a different color.

In FIG. 5A, display 500A shows cable 500 without the processing of color handling engine 303, as perceived by a normal or average user, without CVD. In this case, connector 501A is green, connector 502A is red, and connector 503A is yellow. In FIG. 5B, display 500B still shows cable 500, also without the use of color handling engine 303, but as perceived by a deuteranope user. As shown by their similar shading, the colors of connectors 501B-503B are generally visually indistinguishable from each other by the deuteranope user; in this case, 501B, 502B, and 503B are all perceived as dark green or dark yellow.

In FIG. 5C, color handling engine 303 executes method 400 and it results in an adjusted chromacity of display 500C that enhances a visual distinction between connectors 501C and 502C/503C. To a normal user wearing HMD 102, connector 501C would appear bright green, connector 502C would appear bright pink, and connector 503C would appear white. To the deuteranope user wearing HMD 102, however, connector 501C appears bright yellow, whereas connectors 502C/503C remain dark green or dark yellow. Accordingly, because there is a much greater visual distinction between connectors 501C and 502C/503C (than between connectors 501B and 502B in display 500B, for example), color handling engine 303 makes it much easier for the deuteranope user to manipulate cable 500 properly.

In various embodiments, color handling engine 303 may be configured to identify, in image (e.g., 500A), a real-world object, using feature extraction techniques, in response to detecting that the object has a color (e.g., 501A) corresponding to a particular color vision deficiency of the user. Moreover, color handling engine 303 may produce digital image 504 that overlays a selected alternate color upon the real-world object. In some cases, digital image 504 may have a geometric shape selected to match a shape of the underlying real-world object.

Additionally, or alternatively, color handling engine 303 may produce digital image 507 (e.g., an arrow or icon) near color 501C, with a dynamic visual effect selected from the group consisting of: blinking, flashing, and glowing, that emphasizes the presence of color 501A in the image now being perceived as color 501C. In some cases, legend or window 506 may be also provided with a textual explanation to the deuteranope user that color 501A has been detected and adjusted, or replaced with color 501C.

In some cases, color handling engine 303 may maintain a position of digital image 504 and/or 507 on display frame 500C relative to the real-world object 500 as the user (and/or the object) moves in the real-world environment. Color handling engine 303 may process a selected portion 508 of the image to the exclusion of another portion, in response to a determination that a user's gaze is directed at selected portion 508. Additionally, or alternatively, color handling engine 303 may process the image as described above in response to a detection that a distance between the user's hand 509 and real-world object 500 meets a threshold value.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A hardware memory device having program instructions stored thereon that, upon execution by a hardware processor of an Information Handling System (IHS), cause the IHS to:
   identify the presence of a color, in an image to be displayed by a Head-Mounted Device (HMD) worn by a user, that the user is incapable of naturally identifying;
   in response to the identification: (a) apply a first set of RGB adjustments to a foreground portion of the image, wherein the foreground portion comprises one or more digital image overlays to the exclusion of real-world objects, and (b) apply a second set of RGB adjustments to a background portion of the image, wherein the background portion comprises one or more real-world objects to the exclusion of digital image overlays, wherein the first set of RGB adjustments is different from the second set of RGB adjustments; and
   produce a digital image indicator configured to indicate to the user that the color has been adjusted or replaced according to the naturally unidentifiable color, the digital image indicator overlaid on the background portion and distally separated from the foreground portion of the image.

2. The hardware memory device of claim 1, wherein the foreground portion further comprises a given overlay having a geometric shape selected to match a shape of an underlying real-world object.

3. The hardware memory device of claim 2, wherein the program instructions, upon execution, further cause the IHS to maintain the given overlay positioned over the real-world object as the user moves around a physical environment.

4. The hardware memory device of claim 1, wherein the program instructions, upon execution, further cause the IHS to apply the first and second sets of RGB adjustments to a selected portion of the image to the exclusion of another portion of the image in response to a determination that the user's gaze is directed at the selected portion.

5. An Information Handling System (IHS), comprising:
   a host processor; and
   a memory coupled to the host processor, the memory having program instructions stored thereon that, upon execution, cause the IHS to:
   receive an image of a real-world environment from a camera coupled to a Head-Mounted Device (HMD) worn by a user in a virtual, augmented, or mixed reality (xR) application;
   identify, in the image, a real-world object having a color corresponding to a color vision deficiency of the user;
   in response to a distance between the user's hand and the real-world object meeting a threshold value, apply a first set of RGB adjustments to a foreground portion of the image and apply a second set of RGB adjustments to a background portion of the image, wherein the first set of RGB adjustments comprises at least one of: an Alpha, a Beta, or a Gamma value, and wherein the second set of RGB adjustments comprises at least one of: a different Alpha, a different Beta, or a different Gamma value; and
   produce a digital overlay image indicator, for display by the HMD, that indicates to the user that the color has been adjusted or replaced according to the naturally unidentifiable color, the digital image indicator overlaid on the background portion and distally separated from the foreground portion of the image.

6. The IHS of claim 5, wherein the color vision deficiency reduces the user's ability to naturally distinguish between a plurality of colors.

7. The IHS of claim 5, wherein the foreground portion comprises one or more digital image overlays to the exclusion of real-world objects.

8. The IHS of claim 5, wherein the background portion comprises one or more real-world objects to the exclusion of digital image overlays.

9. The IHS of claim 5, wherein the program instructions, upon execution, further cause the IHS to produce the digital image indicator with a dynamic visual effect selected from the group consisting of: blinking, flashing, and glowing.

10. The IHS of claim 5, wherein the foreground portion has a geometric shape selected to match a shape of the real-world object.

11. The IHS of claim 5, wherein to produce the foreground portion, the program instructions, upon execution, further cause the IHS to maintain a position of the foreground portion on a display frame relative to the real-world object as the user moves in the real-world environment.

12. The IHS of claim 5, wherein to produce the foreground portion, the program instructions, upon execution, further cause the IHS to maintain a position of the foreground portion on a display frame relative to the real-world object as the real-world object moves in the real-world environment.

13. The IHS of claim 5, wherein the program instructions, upon execution, further cause the IHS to provide an audio cue associated with the color for reproduction by the HMD in response to the distance between the user's hand and the real-world object meeting the threshold value.

14. The IHS of claim 5, wherein to identify the real-world object the program instructions, upon execution, further cause the IHS to analyze a selected portion of the image to the exclusion of another portion of the image in response to a determination that a user's gaze is directed at the selected portion.

15. A method, comprising:
   receiving an image from a Head-Mounted Device (HMD) worn by a user;
   identifying, in the image, a real-world object having a first color;
   determining, based upon a calibration process, that the user does not naturally distinguish between the first color and a different, second color;
   in response to a determination that the user's gaze is directed at the first real-world object, applying a first set of RGB adjustments to a foreground portion of the image and applying a second set of RGB adjustments to a background portion of the image, wherein the first set of RGB adjustments comprises a given set of Alpha, Beta, and Gamma values, and wherein the second set of RGB adjustments comprises a different set of Alpha, Beta, and Gamma values, wherein the first and second sets of RBG adjustments turn the first color into another color distinguishable by the user from the second color; and
   producing a digital image indicator that indicates to the user that the first color has been adjusted or replaced according to the naturally unidentifiable color, the digital image indicator overlaid on the background portion and distally separated from the foreground portion of the image.

16. The method of claim 15, wherein the foreground portion comprises one or more digital image overlays to the exclusion of real-world objects and the background portion comprises one or more real-world objects to the exclusion of digital image overlays.

17. The method of claim 15, wherein the foreground portion has a geometric shape selected to match a shape of the real-world object, and wherein the method further comprises causing the foreground portion to blink, flash, or glow.

\* \* \* \* \*